United States Patent [19]

Mayes, Jr. et al.

[11] 4,137,354
[45] Jan. 30, 1979

[54] RIBBED COMPOSITE STRUCTURE AND PROCESS AND APPARATUS FOR PRODUCING THE SAME

[75] Inventors: James T. Mayes, Jr., St. Louis, Mo.; Will A. Rosene, New Orleans, La.

[73] Assignee: McDonnell Douglas Corporation, St. Louis, Mo.

[21] Appl. No.: 774,760

[22] Filed: Mar. 7, 1977

[51] Int. Cl.² ............................................. B31D 3/02
[52] U.S. Cl. .................................. 428/116; 156/175; 428/36; 428/73; 428/118
[58] Field of Search ....................... 156/197, 173–175, 156/169; 427/116–118

[56] References Cited

U.S. PATENT DOCUMENTS

| | | | |
|---|---|---|---|
| 3,300,354 | 1/1967 | Duft | 428/116 X |
| 3,645,033 | 2/1972 | Figge | 428/116 X |
| 3,765,980 | 10/1973 | Hurlbut et al. | 156/175 |
| 3,887,739 | 6/1975 | Kromrey | 156/197 X |
| 3,940,891 | 3/1976 | Slysh | 428/116 X |
| 4,012,549 | 3/1977 | Slysh | 428/116 |
| 4,025,675 | 5/1977 | Jonda | 428/116 X |
| 4,052,523 | 10/1977 | Rhodes et al. | 428/116 |

Primary Examiner—David A. Simmons
Attorney, Agent, or Firm—Gravely, Lieder & Woodruff

[57] ABSTRACT

A composite structure includes a grid having filaments built up in a stacked arrangement in rows with the rows crossing at nodes where the filaments of the crossing rows are interlaced. None of the filaments passes directly through any node, but instead the filaments of each row pass to the sides of a central area in the node with half being on one side of the central area and half being on the other side. The filament lay-up around the nodes is such that only two filaments cross at any one location thus equalizing filament build-up at the nodes and webs. The stacked array of filaments is impregnated with a resin, which may be applied to the filaments before or after the lay-up, and the resin upon being cured forms a hard matrix in which the filaments are embedded. Preferably, the rows of filaments assume three different orientations, with those orientations being at 60° angles with respect to each other. Moreover, at each node the rows of all three orientations intersect so that the rows delineate voids having the shape of equilateral triangles. The grid may be flat, substantially flat, or concave or it may be tubular. Other orientations for the rows of filaments are possible.

The filaments of a flat grid structure may be laid into place with a computer controlled plotting or drafting machine fitted with an applicator head which passes over a surface area having pin-like nodal elements arranged in rows corresponding to the rows for the filaments. The applicator head includes a needle and a supply of filament, with the latter being threaded into the former and emerging therefrom at the surface area. The plotter moves the applicator head such that its needle moves along the rows of nodal elements, and as it does, the filament pays out of the needle. The filaments for a tubular grid structure may be laid into the crossing rows by a machine which braids, wraps or winds the filaments about a mandrel and between the nodes. The mandrel outwardly from the nodal elements is provided with rotatable orienting pins which deflect the filaments to the proper sides of the nodal elements.

17 Claims, 18 Drawing Figures

RIBBED COMPOSITE STRUCTURE AND PROCESS AND APPARATUS FOR PRODUCING THE SAME

BACKGROUND OF THE INVENTION

This invention relates in general to composite structures and more particularly to a ribbed composite structure and a process and apparatus for producing such a structure.

Where light weight and high strength are required, composite structures composed of filaments imbedded in resin or other martricies compare favorably with light weight metals such as aluminum and titanium. Indeed composite structures are in many instances superior to metals. For example, where the loading is taken in the direction of the fibers, composite structures of significantly lighter weight have greater strength than equivalent metal structures. Also, they are usually less expensive.

Perhaps the best way of increasing the strength of any structure without significantly increasing its weight is to incorporate ribs into the structure, and where the structure must possess equal strength in all directions the most desirable rib arrangement is the so-called isogrid. In this arrangement the ribs intersect at nodes with the ribs at any one node being arranged at 60° angles. %angles. As a result the intersecting ribs form an array of equilaterial triangles.

The isogrid rib pattern is quite difficult to form in metals since it requires machining and these machining operations are from a practical stand point restricted to flat work. Thus, when an isogrid structure is required in a cylindrical or other tubular configuration, the isogrid pattern is machined into flat metal and then the metal is rolled into the tubular configuration and its ends are joined together along an axial seam. The seam of course detracts from the strength of the overall structure.

The isogrid arrangement has heretofore been equally difficult to form in composite structures, but the problems are of a different nature. If the isogrid structure is to have adequate strength, the filaments must not only be continuous through the nodes, but further must not undergo any significant change in direction. This necessitates that the filaments cross at each node and as a result a substantial build-up of filaments occurs at each node, while excessive spacing exists between the filaments beyond the nodes. These spaces are filled with resin which does not have near the strength of the filaments. In addition holes drilled into the nodes for attachment purposes cut filaments and reduce the strength of the overall structure. Some lay-up procedures result in excessive bending of the filaments at the nodes, and this likewise reduces the strength of the overall structure.

SUMMARY OF THE INVENTION

One of the principal objects of the present invention is to provide a ribbed composite structure which is extremely strong, highly compact, and light in weight. Another object is to provide a composite structure of the type stated in which the ribs intersect at nodes without excessive filament build-up at the nodes. Another object is to provide a composite structure in which the filament build-up at the nodes for any cycle or layer of filament is for all intents and purposes no greater than the thickness of two filaments. An additional object is to provide a composite structure of the type stated in which filaments are continuous through the structure and do not significantly deviate in direction either between the nodes or at the nodes. Still another object is to provide a composite structure having nodes provided with small voids capable of receiving attachment devices. Yet another object is to provide a composite structure having smooth structural surfaces to which laminate skins or other membranes may be attached. An additional object is to provide a process and apparatus for producing the composite structure of the type stated. These and other objects and advantages will become apparent hereinafter.

DESCRIPTION OF THE DRAWINGS

In the accompanying drawings which form part of the specification, and wherein like numerals and letters refer to like parts wherever they occur.

DETAILED DESCRIPTION

Referring now to the drawings (FIG.1), A designates a composite structure which is light in weight and highly compact, yet extremely strong. It is therefore ideally suited for structural purposes where weight is an important consideration such as in aircraft. The composite structure includes a grid 2 which assumes the load and skin 4 which is attached to the grid 2 and forms a protective cover. The grid 2 is composed of a multitude of interlaced filaments 6 which are stacked or layered and a matrix 8 in which the filaments 6 are embedded. The filaments 6 are quite strong and each is continuous from one side of the grid 2 to the other. Moreover, they are substantially straight from one side of the grid 2 to the other. However, without the matrix 8 the filaments 6 are limber and incapable of carrying compression loads.

Figure 1:
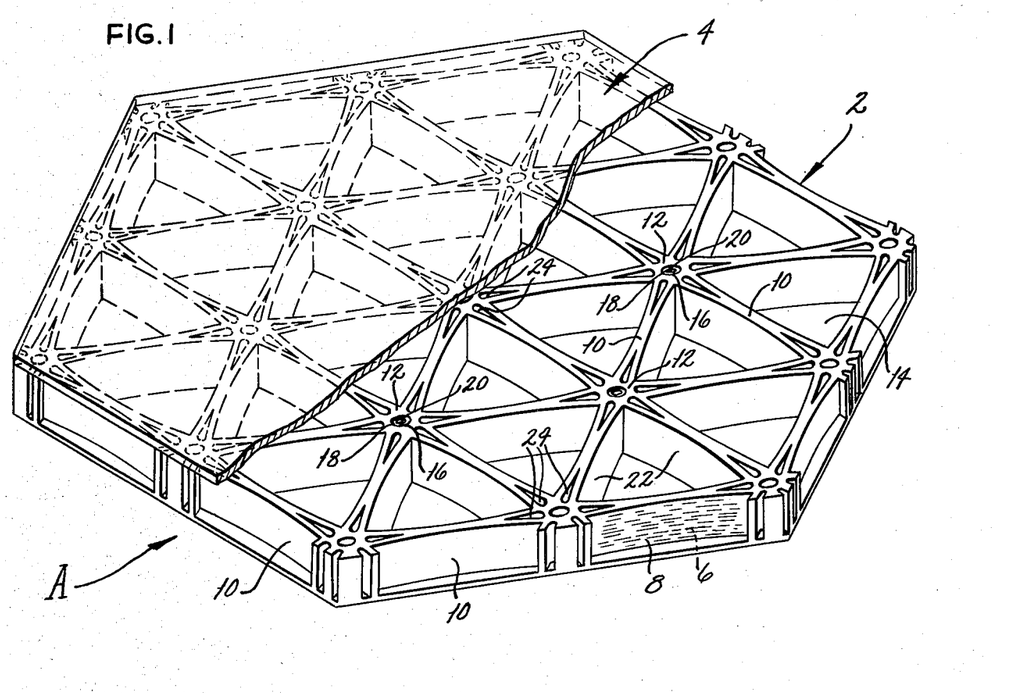
FIG. 1 is a perspective view of a flat composite structure with its skin partially broken away to reveal the underlying structural grid.

The filaments 6 may be fiberglass, graphite yarn, Kevlar or practically any other type of thread or yarn. Indeed, they may even be metal wire. The matrix 8 may be epoxy resin, phenolics, polimides, polyester resin or any thermosetting or thermoplastic resin.

Where the composite structure A must withstand forces of about equal magnitude in any direction of the plane assumed by the skin 4, the grid 2 should have the configuration of a so-called isogrid (FIG. 1). When so configured, the grid structure 2 consists of a plurality of webs 10 which intersect at nodes 12 and are separated from each other by triangular voids 14. The voids 14 are equal in size and each one is in the shape of an equilateral triangle. Six webs 10 radiate from each internal node 12 and those webs 10 are spaced apart at equal angles. Thus, adjacent webs 10 at any node 12 are located at 60° with respect to each other. Moreover, every web 10 is located at 180° with respect to some other web 10 and in effect forms a straight line continuation of that other web 6. Each node 12 furthermore has a centrally disposed hole 16 which may be occupied by a metal insert or node pin 18. The node pin 18 should have a knurled or otherwise roughened side surface to prevent it from slipping out of the hole 16, and may further be provided with a threaded hole 20 to enable objects to be fastened to it and of course to the composite structure A as well.

The webs 10 at their ends, where they merge into the nodes 12, are somewhat wider than at their mid-portions. As a result, each web 10 has slightly curved or concave side walls 22, and the sides of the equilateral triangles for rhe voids 14 are slightly convex. The surfaces of the side walls 22 are formed entirely from the material of the matrix 8 and are quite smooth. Moreover, the thickened ends of each web 6 have thin triangular voids 24 so that the webs 10 at their ends possess a bifuricated appearance.

The webs 10 consist of nothing more than a plurality of filaments 6 (FIG. 2) arranged generally parallel to one another in strata or cycles and held firmly in position by the matrix 8. The filaments 6 within each web 10 are arranged in alternating pairs with the filaments 6 of one pair being parallel, and the filaments 6 of the other pair being crossed. More specifically, the first filament 6 in extending from one end of the web 10 to the other crosses from the left side of the web 10 to the right side of the web 10 (FIG. 3) and in so doing forms one side leg of each small triangular void 24 in the web 10. The second filament 6 crosses from the right side of the web 10 to the left side and in so doing forms the other side of each small triangular void 24. Moreover, the second filament 6 at the midpoint of the web 10 crosses over the first filament 6. The third filament 6 extends along the left side of the web 10, while the fourth filament 6 extends along the right side. Thus, the first and second filaments 6 constitute one pair, while the third and fourth constitute another pair. The fifth filament 6 is oriented the same as the first filament 6 and the sequence is repeated. The crossing filaments 6 prevent separation of the web 10 under compression loading, while the parallel filaments 6 increase the area moment of inertia of the web 10 intercalating the crossing filaments 6, forming a truss-like structure, so that the web 10 is better able to withstand stresses, particularly bending stresses created by moments applied to the grid 2.

Figure 2:
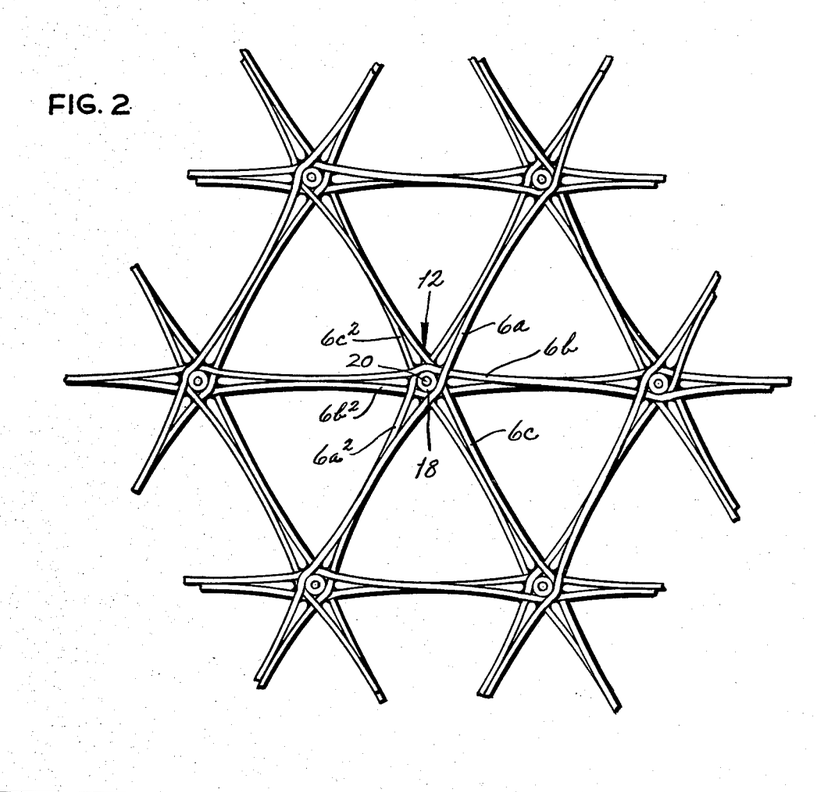
FIG. 2 is a fragmentary plan view showing the arrangement of the filaments in the grid.
Figure 3:
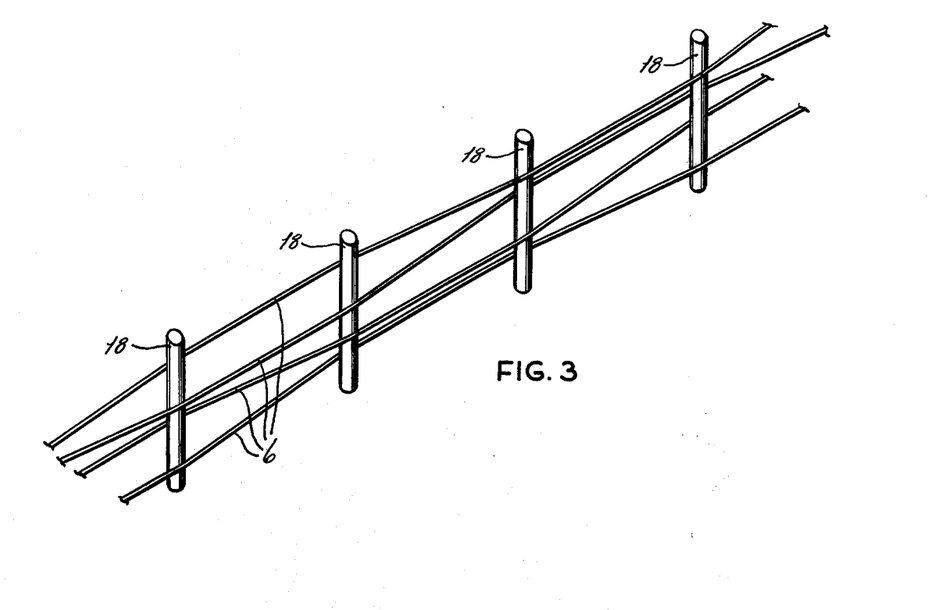
FIG. 3 is an exploded perspective view showing the filaments along a single row.

Since at the nodes 12 each web 10 is oriented at 180° with respect to another web 10, it in effect forms a straight line continuation of two other webs 10. In other words, the webs 10 are arranged end to end in rows which cross at 60° angles, the crossing points being, of course, the nodes 12. Within each row of webs 10, the filaments 6 of the various strata are common to all of the webs 10 of the row, there being no break or interruption of a filament 6 from one web 10 to the next web 10 in the row (FIG. 2). Thus, the filaments 6 pass through the nodes 12 without interruption. In this regard, none of the filaments 6 passes through the center of a node 12, but instead the filaments 6 pass to the sides of the holes 16 in the nodes 12. Since the filaments 6 cross through the nodes 12 at 60° angles, this imparts a somewhat circular appearance to the nodes 12 and gives them somewhat greater area than might otherwise be expected. Moreover, a filament 6 which crosses from one side to the other of a web 10, in the next web 10 is entirely on one side of that web 10 (FIG. 3). The arrangement is such that a filament 6 in passing through the grid 2 alternates from a crossing to a non-crossing disposition with respect to the webs 10 through which it extends.

As previously noted, the filaments 6 are arranged in cycles or strata, and each stratum contains as many filaments 6 as there are rows of webs 10. For example, the first stratum contains the first or uppermost filaments 6 of the several rows of webs 10. The second stratum contains the second filaments of the several rows of webs 10. Since each filament 6 is continuous through its entire row, at each node 12 three filaments of each stratum cross. The three filaments cross, however, such that they are never stacked three high, but at the most only two high. For example, at the first stratum the uppermost filament 6a of one row passes through a particular node 12 and in so doing occupies an area to the side of the node pin 18 in the node 12 (FIG. 2). The uppermost filament 6b in the second row at that node 12 passes through another area to the side of the node 12, that area being offset about 120° from the area occupied by the filament 6a. In so doing the filament 6b crosses under the filament 6a and this crossing point is spaced outwardly away from the node pin 18. The lowermost filament 6c in the third row passes through still another area to the side of the node, with that area being intermediate the areas occupied by the filaments 6a and 6b. In so doing, the filament 6c passes under the other two filaments 6a and 6b of the uppermost stratum. However, the location where the filaments 6a and 6b cross is located outwardly in the node 12 from the filaments 6c which is next to the node pin 18. The filaments 6a and 6b can, therefore, deflect slightly into the space located outwardly from the filament 6c. Consequently, the three filaments of a stratum at any node 12 are never stacked three high on each other, but are only stacked two high. This prevents excessive filament build-up at the nodes 12.

In the next stratum (FIG. 2), the crossing point of the filaments $6a^2$ and $6b^2$ at the node 12 will be located 180° from the crossing point of the filaments $6a$ and $6b$ of the first stratum. Similarly, the intermediate area occupied by the filament $6c^2$ of the second stratum is 180° from the intermediate area occupied by the filament $6c$ or, in the other words, is on the other side of the pin 18. Likewise, the filament $6c^2$ is set inwardly from the crossing point for the filaments $6a^2$ and $6b^2$ so that the latter can deflect downwardly to the side of the filament $6c^2$. Indeed, each crossing point for a pair of adjacent filaments 6 at a node 12 is spaced outwardly from the node pin 18, while still another adjacent filament 6 passes directly against the node pin 18 in the space between the crossing point and the node pin 18. For example, the crossing point for the filament $6c$ and the filament $6a^2$, which is immediately below it in the node 12, is spaced outwardly from the surface of the pin 18 against which the filament $6b$ is laid. The crossing points for adjacent filaments 6 in the node 12 are located at 120° intervals around the node pin 18.

To move the crossing points of adjacent filaments 6 outwardly without causing excessive deflection of the filaments 6 at the nodes 12, the node pins 18 and the holes 16 onto which they fit should have a diameter of not less than about 3 times and not greater than about 6 times the diameter of the filaments 6.

The filaments 6 of the grid 2 for the composite structure A may be laid into the isogrid pattern manually or much more quickly by a computer-controlled plotter 30 (FIG. 4) having an applicator head 32 attached to it. The plotter 30 is used in conjunction with a lay-up board 34 located beneath the applicator head 32. In effect, the plotter 30 moves the applicator head 32 over the lay-up board 34, tracing the predetermined pattern as it does. That pattern corresponds to the filament orientation in the grid 2.

The plotter 30 is nothing more than a conventional computer-controlled drafting machine without the stylus assembly for applying ink to the paper or other drawing material. The applicator head 32 takes the place of the stylus assembly. The plotter 30, being a conventional drafting machine, includes (FIG. 4) a table 36, parallel rails 38 along each side of the table 36, and motor-driven carriages 40 on the rails 38. The two carriages 40 are connected by a cross beam 42 which extends over the table 36, and the beam 42 carries a cross head 44 which is driven along the beam 42 by another motor. The applicator head 32 is bolted firmly to the cross head 44 of the plotter 30. Accordingly, the carriages 40 when energized move the applicator head 32 parallel to the rails 38, while the cross head 44, when energized, moves the applicator head 32 perpendicular to the rails 38. Thus, the pattern traced by applicator head 32 depends on the manner in which the carriage 40 and the cross head 44 are operated with respect to each other by their respective motors, and this in turn is controlled by a computer program.

The applicator head 32 includes (FIG. 4) rigid mounting base 46 which is bolted firmly to the cross head 44, and projecting downwardly from the base 46 at a right angle to the table 36 is a spindle 48 which contains an axial center bore 40. The spindle 48 is capable of rotating as well as moving upwardly and downwardly with respect to the head 32, but its downward movement is limited so that it will not drop onto the table 36. Moreover, the spindle 48 is spring loaded in the downward direction. Attached to the lower end of the spindle 48 is a needle retainer 52 having a downwardly opening slot 53 into which a needle 54 fits, the needle 54 being held in position by a pair of ball lock pins 55 which align with indentations in the side of the needle 54.

Figures 5, 6, 7:
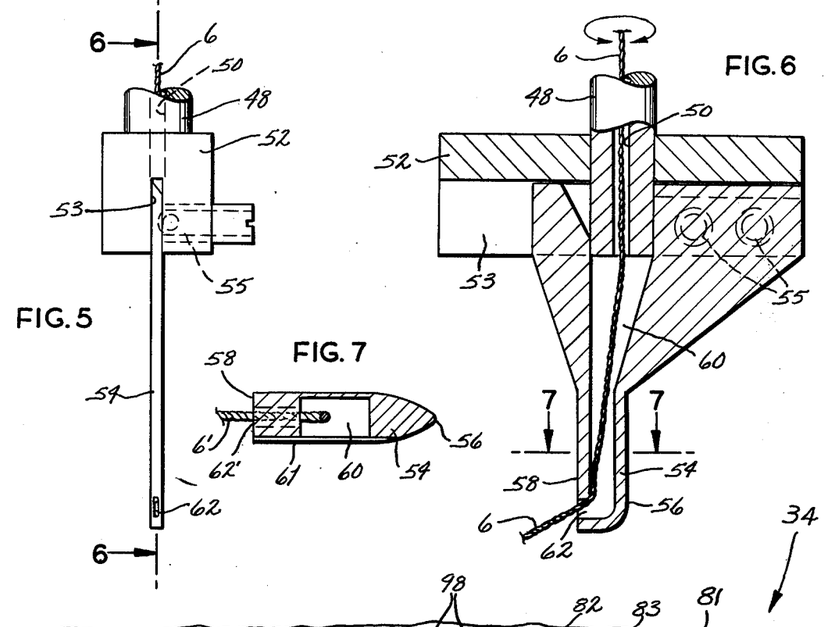
FIG. 5 is a rear elevational view of the needle on the assembly head of the plotter.
FIG. 6 is a sectional view taken along line 6—6 of FIG. 5 and showing the filament extended through the needle.
FIG. 7 is a sectional view taken along line 7—7 of FIG. 6.

The needle 54 (FIGS. 5–7) projects downwardly from the needle retainer 52 and is quite narrow and elongated in cross section. The lower end has a beveled leading edge 56 and a squared off trailing edge 58. The leading edge 56 is set slightly rearwardly from the axis of rotation for the spindle 48 which carries the needle 54. Extending inwardly from one side of the needle 54 is a cavity 60 which opens upwardly into the lower end of the spindle 48. This side of the cavity 60 is closed by a foil side wall 61 adhered to the side surface of the needle 54. At its lower end, the cavity 60 opens rearwardly through a discharge aperture 62 located in the squared off trailing edge 58.

The upper end of the center bore 50 in the spindle 48 is located directly below a feed cup 64 (FIG. 4) which is mounted firmly on the upper surface of the mounting base 46. Next to the feed cup 64 is an upwardly directed spindle 66 which projects through and confines a cop or spool 68 having filament 6 wound about it. The upper end of the spool 68 is connected with a tensioning device 70 for preventing the spool 68 from rotating too quickly. The filament 6 from the spool 68 is threaded through the feed cup 64, the center bore 50 of the spindle 48, the cavity 60 in the needle 54, and emerges from the needle 54 through the discharge aperture 62. This enables the filament 6 to pay out of the needle 54 as the applicator head 32 moves over the lay-up board 34.

To the side of the cup 64 the rigid base 46 supports a resin container 76 (FIG. 4) having a valve 78 located at its lower end. Attached to the valve 78 is a discharge nozzle 80 which is directed toward and terminates immediately above the cup 64 through which the filament 6 enters the spindle 48 and needle 54. The container 76 contains a liquid resin which upon being cured is suitable for the matrix 8. When the valve 78 is opened, the resin flows downwardly through the nozzle 80 and accumulates in the cup 64 where it surrounds the filament 6 as that filament is passing through the cup 64. Hence, the filament 6 is coated with the resin.

Figure 4:
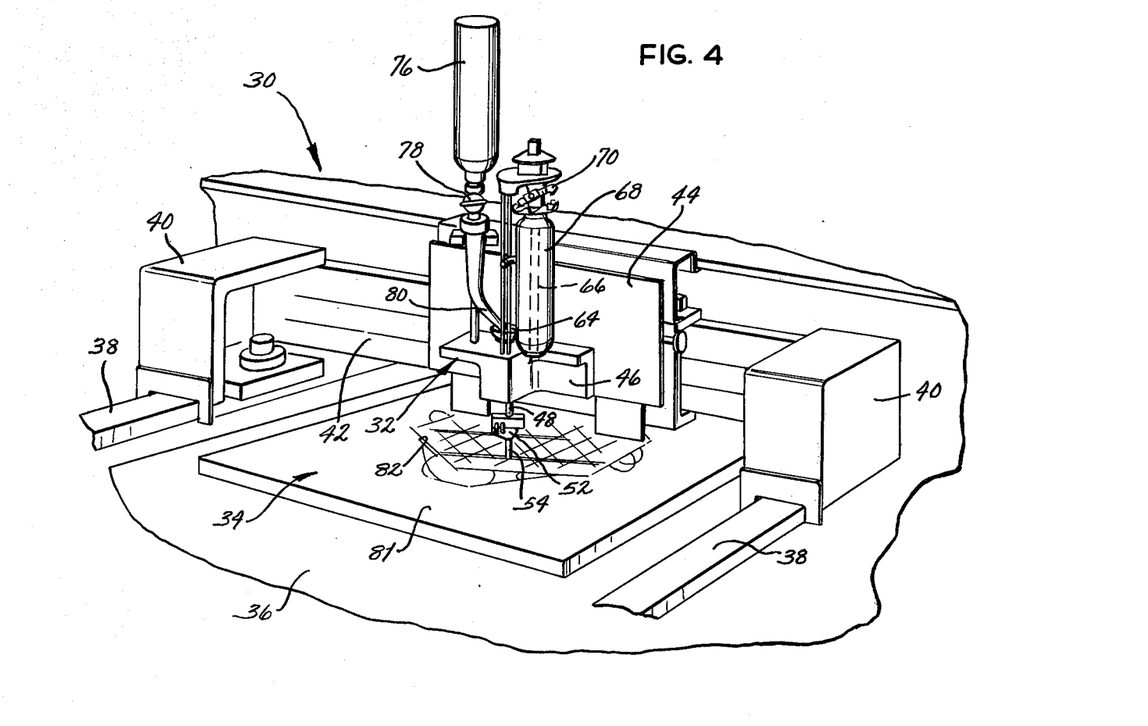
FIG. 4 is a perspective view of a modified plotter used to lay the filaments into the interlaced grid pattern.

The lay-up board 34 is secured firmly to the table 36 directly below the area over which the applicator head 32 moves (FIG. 4). The board 34 includes a base plate 81 (FIGS. 8 & 9) containing an upwardly opening cavity 82 which has about the same configuration as the periphery of the composite structure A. Fitted into the cavity 82 is a laying plate 83 which possesses a lesser thickness than the base plate 81, so that a portion of the cavity 86 exists above the upper surface of the plate 83. The height of the unoccupied portion should at least equal the thickness of the grid 2. Projecting upwardly from the laying plate 83 are positioning bosses 84, each of which is an equilateral triangle. The positioning bosses 84 are arranged with equal spacing between their opposed side surfaces. These side surfaces are parallel and as a result the apexes of the bosses 84 project toward nodal voids in the cavity 82.

Each positioning boss 84 projects into and positions a molding block 86 formed from a resilient material such as RTV-J silicone rubber. The molding blocks 86 are likewise triangular and possess the same orientation as the positioning bosses 84 over which they are fitted.

Figure 8:
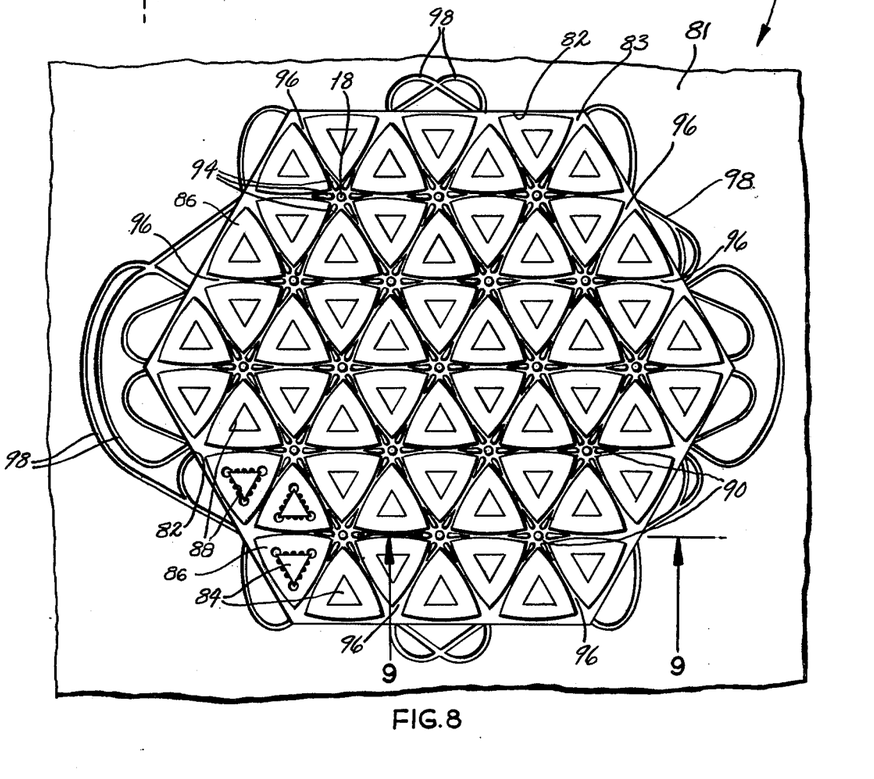
FIG. 8 is a plan view of a base plate and lay-up plate with the latter having mold blocks arranged on it to provide channels for receiving the filaments of the grid.
Figure 9:
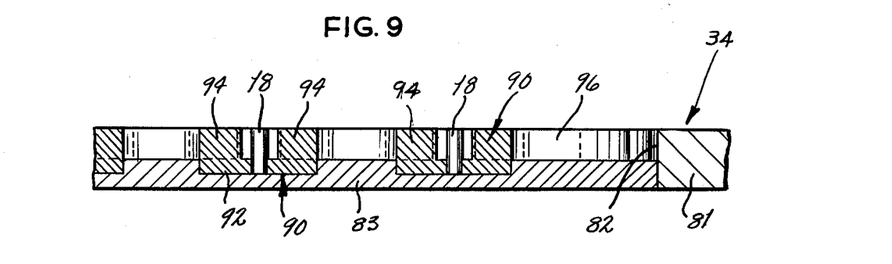
FIG. 9 is a sectional view taken along line 9—9 of FIG. 8.

Thus, the opposed side walls of adjacent blocks 86 are for all intents and purposes parallel. While the exterior side walls of each block 86 are smooth, they are actually slightly convex in the horizontal direction between apexes, but not in the vertical direction. The apexes on the other hand are slightly rounded. Internally, each block 86 is provided with a triangle void 88 which is sized to receive one of the positioning bosses 84. The walls which define the void 88 are formed from a plurality of semi-circular reliefs located side-by-side and these reliefs create an undulated configuration (FIG. 8-lower left). The apexes of the voids 88 are rounded in the form of arcs. Th semi-circles and apex arcs enable the blocks 86 to give in the lateral direction, that is, they permit the smooth exterior walls of the blocks 86 to move outwardly without placing the resilient material of the blocks 86 under excessive compressive stress.

Figure 10:
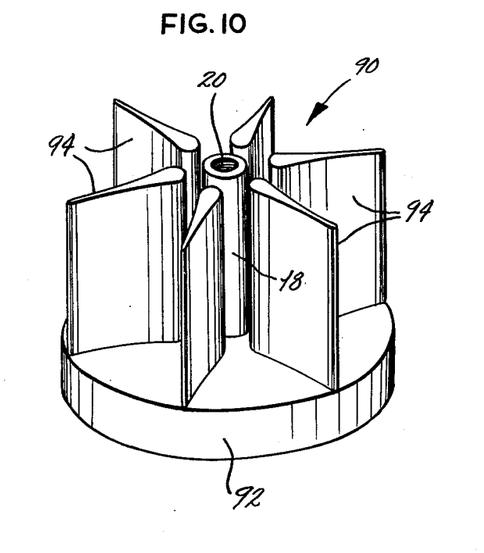
FIG. 10 is a perspective view of one of the nodal clusters.

The laying 83 also has a plurality of nodal clusters 90 centered between apexes of the positioning bosses 84 and mold blocks 86. In this regard, the positioning bosses 84 are arranged such that the sides of adjacent triangles are parallel, in which case six triangular bosses 84 are arranged around each node 12, and the apexes of these triangles point toward a void between them. Within this void is a single nodal cluster 90. Each nodal cluster 90 includes (FIG. 10) a circular base 92 which fits into a socket in the laying plate 83, and the base 92 has a node pin 18 fitted into it, with the pin 18 forming the center of the cluster 90. Around the pin 18 are six small wedges 94, which likewise project upwardly from the base 92. The back or large ends of the wedges 94 are rounded and are presented toward, yet spaced from the pin 18. The small or pointed ends of the wedges 94 project radially outwardly and lie along radii which are centered with respect to the spaces between the opposed side walls of the positioning bosses 84 and the mold blocks 86 which fit over them.

The voids left in the cavity 82 after the mold blocks 86 and the nodal clusters 90 have been positioned in it are in the configuration of the composite structure A, and indeed the filaments 6 are laid into those voids to produce the composite structure A. In this regard, the voids form a series of intersecting channels 96 (FIG. 8) through the cavity 82, and these channels are straight and uninterrupted, except for the presence of the node pins 18 and wedges 94 where they intersect. Each channel 96 at its ends opens into a curved transition groove 98 in the base plate 81, and that groove leads to the end of another straight channel 96.

To produce the composite structure A, the laying board 34 is positioned on the table 36 in the correct location beneath applicator head 32. The plotter 30, on the other hand, is provided with a program which corresponds to the pattern formed by the channels 96 extending through the cavity 82 of the lay-up plate 81 and the grooves 98 extending beyond the cavity 82. In other words, the program will cause the applicator head 32 to trace a pattern which is the same as that of the channels 96 and grooves 98. In addition, the spool 68 of filament 6 is positioned over the upright spindle 66 on the applicator head 32 and engaged with the tensioning device 70. The filament 6 is passed through the feed cup 64 and then downwardly through the center bore 50 in the rotatable spindle 48 and the cavity 60 in the needle 54. The filament 6 emerges from the discharge aperture 62, and its end is secured to the base plate 81 in the direction away from that in which the needle 54 will initially move. Thus, the beveled leading edge 56 projects in the direction of movement. The initial position of the cross head 44 on the plotter 30 places the needle 54 directly over one of the straight line channels 96 leading through the cavity 84 in the lay-up plate 81, and inasmuch as the spindle 48 is spring loaded, the needle 54 is urged downwardly in contact with the laying plate 83 which fits into the cavity 82.

When the plotter 30 is energized, its carriages 40 and its cross head 44 move such that the needle 54 glides through the straight line channel 96 in which it is initially disposed, with the movement being away from the anchor point for the filament 6. Thus, the lower end of the needle 54 glides between the opposed side surfaces of adjacent triangular mold blocks 86 and to the left or right of the wedges 94 and node pins 18 at the nodal clusters 90. In this regard, the control is precise enough to move the needle to the left or right side of a wedge 94, even though the width of a channel 96 immediately ahead of the wedge 94 is as narrow as 0.100 inches. Indeed, at the first nodal cluster 90, the needle 54 may stay to the left of the two wedges 94 and the node pin 18 in the channel 96, and at the next it will pass to the right of the wedges 94 and node pin 18, while at the next nodal cluster 90 it will again remain at the right of the wedges 94 and node pin 18. This type of movement provides the alternate cross over and straight passage of the filament 6 through a web 10 of the grid structure 2. Of course, as the needle 54 moves through the channel 96, the filament 6 pays out of the needle 54 and is laid into the channel 96.

At the end of the first channel 96 the needle 54 passes into one of the curved transition grooves 98 and the plotter 30 causes the applicator head 32 to curve around such that the needle 54 follows the curvature of the groove 98. At the end of the groove 98, the needle 54 will align with another straight line channel 96 through the cavity 82, and at the entrance to that channel 96 the needle 54 will again undergo substantially straight line movement to lay the filament 6 into the second channel 96. Of course, again there are deviations from strictly linear movement through the channel since the needle 54 must move from side to side in the channel 96 to effect passage by the wedges 94 and node pins 18 at the nodal clusters 90 and cross over between nodal clusters 90.

The needle 54 continues to move through the channels 96 and transition grooves 98 in a predetermined sequence prescribed by the computer program, and that sequence causes the filament 6 to build up in the channels such that they cross at the nodal clusters 90 and alternate from side to side between the nodal clusters 90 in the interlaced manner previously described. The build-up of course forms the one major component of the webs 10 in the grid 2. As the needle 54 moves through the channels 96 its beveled leading edge 56 assists in deflecting it to the sides of the wedges 96 and the node pins 18 and further assists in guiding it through the transition grooves 96.

Figure 11:
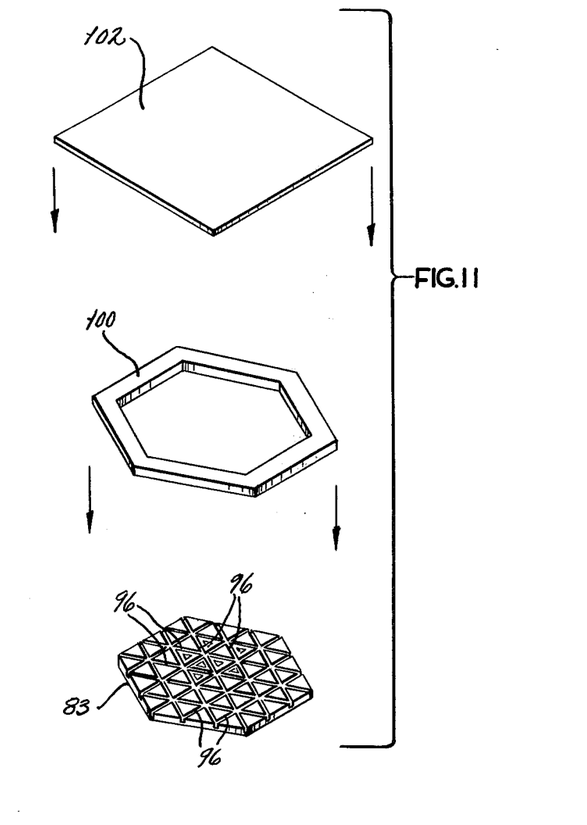
FIG. 11 is an exploded perspective view of the lay-up plate, the curing ring, and the curing plate which are all fitted together when the weave of interlaced filaments is impregnated with resin and the resin is cured.

The other major component of the grid 2, namely the matrix 8 may be formed in one of two ways. First the resin may be applied to the filament 6 as the filament 6 passes off the spool 68 and into the spindle 48 of the applicator head 32. This is achieved by opening the control valve 78 and allowing the liquid resin to flow into the feed cup 64. Secondly, it may be applied to the filament after the filaments are laid into the channels 96 of the cavity 82. This is achieved by withdrawing the laying plate 83 from the cavity 82 of the base plate 81, and then surrounding the laying plate 83 with a curing border 100 which is much the same as base plate 81, except that it does not contain any transition grooves 98. Next a layer of woven fabric is laid over the laid up filaments 6 within the confines of the curing border 100. The laying plate 83 and the build up of filaments 6 between them, along with the curing border 100 are then clamped between two curing plates 102 and liquid resin is forced into the area circumscribed by the curing border 100.

Irrespective of the manner in which the liquid resin is applied, the resin accumulates in those portions of the straight channels 96 and nodal areas which are not occupied by the filaments 6. The side surfaces of the triangular mold blocks 86 confine the resin to the filaments 6, so the resin completely impregnates the weave formed by the interlaced filaments 6 and further impregnates the woven fabric. Thereupon, the resin is cured by heating it while it is still in the curing border 100. For most resins the cure is at about 300° F which is substantially below the maximum temperature silicone rubber can withstand. The differential in the linear thermal coefficient of expansion between the silicone rubber of the mold blocks 86 and the metal of the lay-up plate 83 is about 13:1 and is used to pressure mold the composite and the matrix resin during cure cycle. The semicircular reliefs in the blocks 86 are tailored to provide only desired design mold cure pressure (about 50 psig) which is low enough not to squeeze oil from the silicone rubber of the blocks 86, thereby permitting many reuses of the rubber molds. Hence, the triangular mold blocks 86 are not damaged. The undulated interior surfaces of the mold blocks 86 enable those blocks to move inwardly when subjected to lateral forces so that the blocks during the cure are subjected to very little compression. As a consequence, the oils of the rubber remain in the rubber during the cure so that the blocks 86 may be used again.

During the cure the liquid hardens into the rigid matrix 8 which surrounds the filaments 6. Since the liquid resin is shaped by the triangular mold blocks 86, the matrix 8 assumes the same surface texture and configuration as the side faces of the molds blocks 78. This accounts for the smooth slightly concave side faces on the webs 10 of the grid structure 2. The wedges 94 prevent the liquid resin from entering the spaces between the layered filaments immediately beyond the nodes 12, and thereby confine the liquid resin to the areas where it is most useful. This reduces the weight of the grid 2 to an absolute minimum. The resin which impregnates the woven fabric, upon hardening, creates the rigid light weight skin 4 over the grid 2 and further bonds the skin 4 securely to the grid 2.

The composite structure A need not be perfectly flat but may possess slight curvature. No difficulty is encountered laying the filament 6 over a slightly convex surface inasmuch as the spindle 48 is spring loaded downwardly, thus enabling the needle 54 to follow the convex surface.

The grid 2 may likewise be formed in configuration other than the isogrid (FIGS. 15 - 18). For example, a composite structure C (FIG. 15) has its webs intersecting at right angles, in which case the voids between the webs are rectangular, while a composite structure D (FIG. 16) has the webs intersecting at slight angles so that the voids have the shape of parallelograms. A composite structure E (FIG. 17) includes webs which intersect at right angles and diagonal webs which extend through the rectangular areas delineated by the right angle webs. A spar F (FIG. 18) may be made with webs oriented vertically, horizontally, and at 45°.

A modified composite structure B (FIG. 12) possesses a tubular configuration of cylindrical shape. Like the composite structure A, the composite structure B includes a grid 2' and skin 4', but both the grid 2' and skin 4' are tubular instead of flat. The grid 2' consists of braided filaments 6' and a matrix 8' impregnating the braid.

Figure 12:
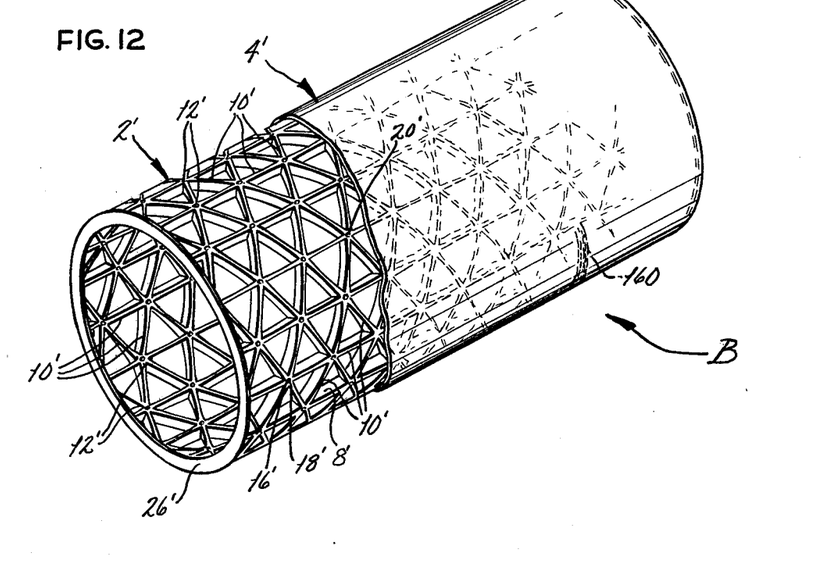
FIG. 12 is a perspective view of a tubular composite structure with the skin of that structure being partially broken away to reveal the grid.

The grid 2' has webs 10' which are arranged in rows of three different orientations. The rows of the first orientation extend longitudinally or axially of the cylindrical configuration. The rows of the second orientation spiral about the cylinder in one direction and cross the axial rows at 60° angles. The rows of the third orientation spiral about the cylinder in the opposite direction and cross both the longitudinal rows and the other spiral rows at 60° angles. All three types of rows are made up of end to end webs 10' and all three rows intersect at common nodes 12'. The structural member B also has triangular voids 14' between the various webs 10' with the nodes 12' being at the apexes of these triangular voids 14'. It also has holes 16' in the nodes 12' and node pins 18' in the holes 16'. The node pins 18' have bores 20' extended completely through them. In addition, the webs 10' have smooth side walls 22' and thin triangular voids 24' at their ends. Finally at each end the cylindrical grid structure 2' has an end ring 26' into which all of rows of webs 10' merge. The skin 4' extends over and is bonded to the webs 10' and rings 26' of the grid 2'.

The cylindrical grid 2' is formed about a mandrel 110 (FIG. 13) having a cylindrical exterior surface from which triangular positioning bosses 84' (FIG. 14-center) project, and these bosses serve as mounts for elastomeric mold blocks 86'. Furthermore, nodal clusters 90' are mounted on the cylindrical mandrel 110 in the voids between the apexes of the triangular positioning bosses 84'. The spaces between the side walls 22' of the mold blocks 86' constitute channels 96', and these channels 96' have three different orientations, namely purely axial, left hand spiral, and right hand spiral. At the ends of the mandrel 110 are truly circumferential transition grooves 98'. The nodal clusters 90' carry the node pins 18' and the wedges 94'. The triangular bosses 84', mold blocks 86', and nodal clusters 90' are the same as utilized on the laying plate 83 for forming the flat grid 2, except for the fact that the node pins 18' carry filament orientation pins 112 (FIG. 14) which help guide the filaments 6' to the proper sides of the pins 18' as the filaments 6 are being laid-up.

Each orientation pin 112 includes (FIG. 14) a flared base portion 114 which is located immediately outwardly from the node pin 18' with which the pin 112 is associated, and this base is somewhat larger in diameter than the insert 18. Actually the base portion 114 is flared at its outwardly presented surface, while its inwardly presented surface is squared off with respect to the axis of the insert 18'. This prevents filaments 6', once they pass over the flared surfaces and come against the insert 18', from moving outwardly away from the mandrel 110. In addition, each pin 112 has reduced deflecting portion 116 which slightly beyond the flared base portion 114 is turned outwardly at about a 45° angle with respect to the axes of the pin 18'. The deflecting portion 116 terminates at a point 118.

Each orientation pin 112 is secured firmly to a mounting shank 120 (FIG. 14) which extends completely through the node pin 18' and into the interior of the hollow mandrel 110 where it is fitted with a crank arm 122. Thus, it is possible to rotate the orientation pin 112 by moving the crank arm 122 with which it is associated. All of the orientation pins 112 in a single axial row are tied together for rotation in unison by a longitudinal actuating rod 124 which extends axially through the interior of the mandrel 110 and is connected to the various crank arms 122 of the pins 112 in that row. Each actuating rod 124 in turn is connected to a suitable actuating mechanism 126 (FIG. 13) for shifting the rod 124 to and fro. The mechanism 126 may be a solenoid, a pneumatic cylinder, or any other linear actuator.

The filaments 6' are laid into the isogrid pattern of the tubular grid 2' by a braiding machine 130 which is a conventional piece of equipment, except for a slight modification. A conventional braiding machine is capable of spiraling the filaments 6' around the mandrel 110 in opposite directions with the crossing filaments 6' being interlaced. In other words, it is capable of producing a conventional braid. The modified machine 130, in addition to laying the filaments 6' into the two spiral orientations, is further capable of laying additional filaments 6' into a longitudinal or axial orientation with the longitudinal filaments 6' being interlaced with the spiral filaments 6'.

The braiding machine 130 includes (FIG. 13) a large annular base 134 having spool carriers 136 and 138 thereon. Each spool carrier 136 and 138 has a spindle 140 which holds a spool or cop 142 of filament 6'. When the machine 130 is operated, the spool carriers 136 move around the large annular base 134 in the clockwise direction, while the spool carriers 138 move in the counterclockwise direction. Moreover, once a carrier 136 passes to the outside of a carrier 138, it will move inwardly so as to pass to the inside of the next carrier 138. It then moves outwardly to pass to the outside of the subsequent carrier 138. The carriers 136 alternate moving inwardly and outwardly with respect to the carriers 138 and likewise the carriers 138 alternate moving inwardly and outwardly with respect to the carriers 136. As the carriers 136 and 138 move around the base 134 along their undulating paths, they pass by guide tubes 144 which project axially from the base 134 at equal circumferential intervals, there being the same number of guide tubes 144 as there are spool carriers 136 or spool carriers 138. Behind the tubes 144 on the back side of the base 134 are more spindles 146, but these spindles are fixed in position on the base 134. Each spindle 146 also carries a spool or cop 142 of filament 6' with the filament 6' being withdrawn and extended through the tubes 144. The filament 6' from the spools or cops 142 on the spool carriers 136 and 138 and on the spindles 146 all pass over a braiding ring 148.

In addition, the braiding machine 130 includes a work supporting frame 150 (FIG. 13) provided with end members 152 located beyond both ends of the annular base 134, and extended between the two sets of end members 152 is a mandrel rod 154 on which the cylindrical mandrel 110 is mounted as well as the actuating mechanism 126 for the orienting pins 112. The rod 154 is centered and extended axially with respect to the annular base 134 and the braiding ring 148. The supporting frame 150 is suspended from a track 156 and is driven along the track 156 by an advancing mechanism 158, the movement being such that the rod 154 moves axially through the annular base 134 and the ring 148. The mechanism 158 has the capability of advancing the rod 154 in either axial direction and at varying speeds.

Figure 13:
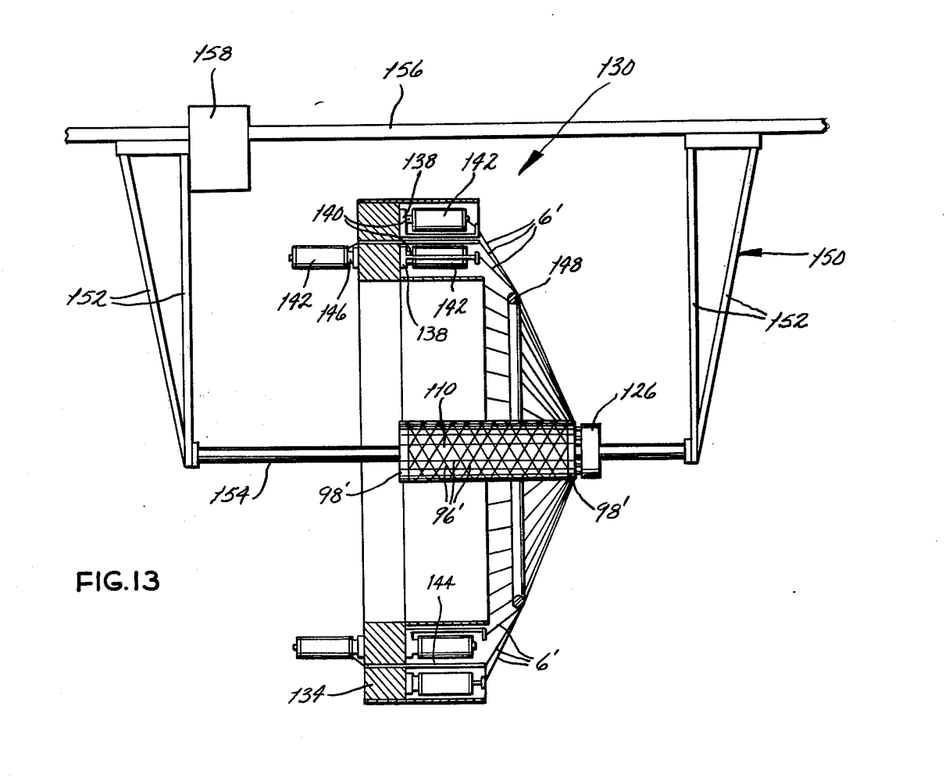
FIG. 13 is a sectional view of a braiding machine and mandrel used to form the tubular grid structure.
Figure 14:
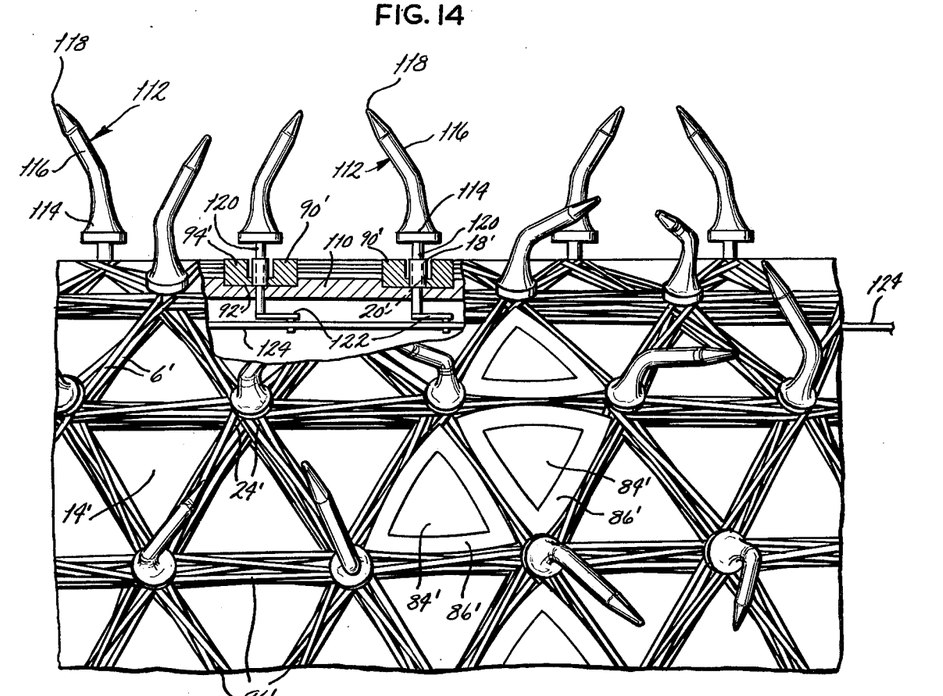
FIG. 14 is an enlarged elevational view of the mandrel with the filaments on it and a few of the triangular mold blocks in place to show the manner in which the filaments pass between them, a small portion of the mandrel being broken away to reveal the actuating mechanism for the orienting pins on it.
Figure 15:
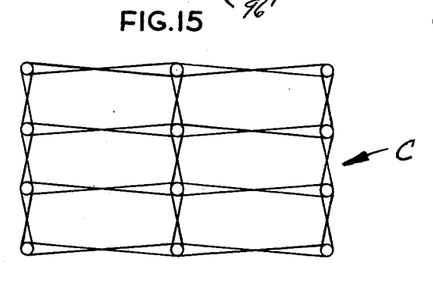
FIG. 15 shows another modified composite structure in which the webs cross at right angles.
Figure 16:
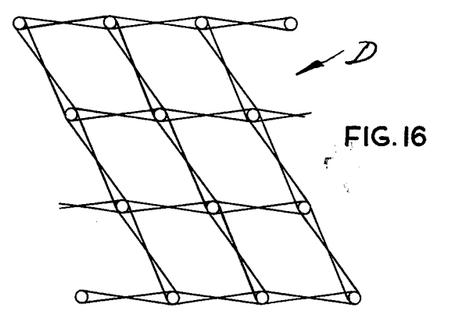
FIG. 16 shows yet another modified composite structure.
Figure 17:
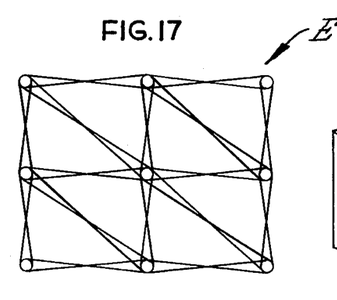
FIG. 17 shows still another modified composite structure in which some of the webs cross at right angles and others extend diagonally.
Figure 18:
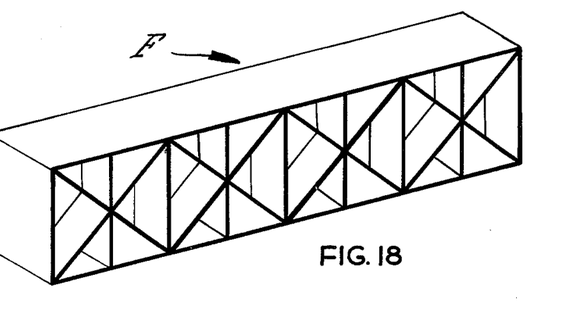
FIG. 18 shows a spar made in accordance with the present invenion.

To produce the tubular grid 2', the mandrel 110 is first installed on the mandrel rod 154, and then the various filaments 6' are withdrawn from their respective spools 142, pulled over the braiding ring 148, and attached to the mandrel 110 at one end thereof (FIG. 13). In this regard, the filaments 6' from the guide tubes 144 are attached to the mandrel 110 at the ends of the various longitudinal channels 96' extended along it. Each filament 6' which is so attached aligns with, or in other words, is disposed directly outwardly from the longitudinal channel 96' with which it aligns. The filaments 6' from the carriers 136 are also connected to the mandrel at the ends of the longitudinal channels 96' since the spiral channels 96' terminate at the same locations. The same is true of the filaments 6' from the carriers 138.

Once the filaments 6' are properly attached, the braiding machine 130 is energized. This involves two basic motions. First the spool carriers 136 and 138 move in their undulating paths around the annular base 134 with the carriers 136 going clockwise and the carriers 138 going counterclockwise. Secondly, the mandrel 110 moves axially through the braiding ring 148. The movements are correlated such that filaments 6' from the spool carriers 136 and 138 spiral about the mandrel 110 dropping into the spiral channels 96' along the mandrel 110. The filaments 6' from the tubes 144 contemporaneously drop into the longitudinal channels 96' along the mandrel 110. The filaments 6' are all guided to the proper sides of the inserts 18' at the nodes 12' by the orienting pins 112. In this regard, a filament 6' upon moving inwardly toward a node 12' will contact the canted deflecting portion 116 of the orienting pin 112 at the node 12 and will slide inwardly over the deflecting portion 116 and thence over the flared base portion 114. In other words, each orienting pin 112 guides the filaments 6' to that side of the node pin 18' opposite from the direction in which its deflecting portion 116 projects. Once into the node 12', the filament 6' is prevented from slipping outwardly by the squared off end of the orienting pin 112.

After reaching the end of the mandrel 110 opposite to that at which the filaments 6' were initially attached, the braiding machine 130 is allowed to operate without any advancement of the mandrel 110. This causes the filament 6' from the spool carriers 136 and 138 to fall into the circumferential transition grooves 98' at that end of the mandrel 110. The movement of the carriers 136 and 138 is of sufficient duration to bring each filament 6' dispensed by them to the end of a spiral channel 96' different from the one it emerged at the end of the first cycle or pass. This prevents sharp bends at the end of the mandrel 110, at least for the spiral filaments 6' and further prevents the spiral filaments 6' from doubling back on each other.

Next the orienting pins 112 are rotated 180 by activating the actuating mechanism 126. This shifts the rods 124 and rotates the pins 112 about 180°. Then the braiding machine 110 is again energized, with the spool carriers 136 and 138 moving in the same direction, but the mandrel rod 154 being advanced in the opposite direction. This causes the filaments 6' from the spool carriers 136 and 138 to drop into the spiral channels 96' while the filaments 6' from the guide tubes 144 drop into the longitudinal channels 96'. In other words, another pass or cycle is made over the mandrel 110. However, during this pass or cycle the filaments 6' drop to the opposite sides of the orienting pins 112 since the pins 112 were rotated during the interval between the cycles.

Sufficient cycles or passes are made to build up the filaments 6' in the channels 96' to the desired height, and in the interval between each pass the orienting pins 112 are rotated so that excessive filament build-up does not occur at the nodes 12'.

Once the filaments 6' are laid to the correct depth for the grid structure 2', the mandrel 110 is detached from the braiding machine 130. In turn, the orienting pins 112 as well as the crank arms 122, actuating rods 124 and actuating mechanisms 126 are detached from the mandrel 110. The nodal clusters 90' including the inserts 18' and small wedges 94', however, remain in place as do the triangular mold blocks 86'.

Thereafter a thin filament is wound around the filaments 6' of the grid 2' and the mold blocks 86' and positioning bosses 84' in between the rows of filament 6' to create a filament wind 160 (FIG. 2) which is several layers deep. The filament wind 160 forms part of the skin 4'. In the alternative, a woven material may be wrapped around the filaments 6' on the mandrel 110.

Once the filament wind 160 for the skin 4' is in place, the entire mandrel 110 with the filaments 6' and wind 160 on it is inserted into a tubular chamber having a diameter equal to the diameter of the wind 160 and a liquid resin is forced into the voids at a pressure of about 70 psig. The resin impregnates the rows of filaments 6' as well as the wind 160, and as to the former is confined in the circumferential and axial directions by the mold blocks 86' on the positioning bosses 84' and the wedges 94 on the nodal clusters 90. Then the resin is cured by heating. This causes the resin to set up into the rigid matrix 8' which bonds the various filament 6' together and further bonds the skin 4' to the grid structure 6'.

Finally, the mandrel 110 is removed. In this regard, the mandrel 110 is divided into several axial segments which may be removed individually. Then the tubular mold chamber, mold blocks 86, and nodal clusters 90 are removed, leaving the modified grid structure B of tubular configuration.

Using similar techniques, the structural member B may be made in other tubular configurations. For example, it may have an elliptical cross section or it may be conical or square. While the braiding machine 130 greatly expedites laying the filaments into the grid pattern 2', the filaments 6' may be laid manually also. Filament and tape winding machines are also available for laying the filament into the desired grid pattern. The webs 10' of the grid 2' need not intersect at 60°, but may intersect at just about any desired angle.

The tubular composite structure B may be also made with preimpregnated filaments 6'. These filaments are coated with matrix, partially cured, and wound on spools or cops. Composites are wound as previously described, then the matrix cure is completed. The resin-filament ratio required is about 50:50.

What is claimed is:

1. A composite structure comprising: a plurality of filaments arranged in distinct rows with the filaments of each row being built up on each other in a stacked disposition, the rows being oriented at different angles and intersecting each other at nodes where the filaments of the intersecting rows remain intact and are interlaced, each node including a central area and the filaments of each row which passes through that node being located on both sides of the central area for the node so that those filaments where they are interlaced with the filaments of another row do not create an excessive build-up of filaments at the node; and a rigid matrix in which the filaments of the rows are embedded, the matrix holding the filaments together to form a rigidified grid-like structure having rigid webs which are joined together at the nodes.

2. A structure member according to claim 1 and further comprising a skin attached to the grid-like structure.

3. A structure according to claim 1 and further comprising an insert in the central areas for at least some of the nodes.

4. A structure according to claim 3 wherein the insert is formed from metal and includes means for engaging and holding a fastening device, whereby other structures may be attached to the structural member at the inserts.

5. A structure according to claim 1 wherein the rows are arranged at three different angular dispositions which vary 60° from one another, and the rows of all three angular dispositions intersect at the same nodes, whereby the webs radiate from the nodes at 60° angles and delineate triangular voids, each of which is in the shape of an equilateral triangle.

6. A structure according to claim 1 wherein the grid-like structure is tubular and curved in cross-section.

7. A structure according to claim 1 wherein at each node the overlying filaments of a row are arranged laterally to a depth of only one filament on each side of the central area for the node.

8. A composite structure comprising a plurality of filaments arranged in parallel first, parallel second, and parallel third rows, with the filaments of each row being built-up on each other in a stacked disposition, the second rows being oriented at 60° with respect to the first rows, the third rows being oriented at 60° with respect to the first rows and also with respect to the second rows, the first, second, and third rows intersecting at nodes such that the rows delineate voids in the shape of equilateral triangles having their apexes at the nodes, each node having a central area through which no filaments pass, the filaments of the crossing rows being interlaced at the nodes, with each row having some of its filaments on one side of the central area for each node through which it passes and the remainder of the filaments on the other side of the central area so that the filaments remain intact for the full lengths of their rows and excessive filament build up does not occur at the nodes; and a rigid matrix in which the filaments of the rows are embedded, the matrix holding the filaments together to form a rigidified grid-like structure having rigid webs which are joined together at the nodes.

9. A structure according to claim 8 wherein the grid-like structure is tubular and curved in cross section; and wherein the first rows extend axially of the tubular configuration, the second rows spiral about the tubular configuration in one direction, and the third rows spiral about the tubular configuration in the opposite direction.

10. A structure according to claim 8 wherein between adjacent nodes in each row, some of the filaments cross from the left side of the one node to the right side of the other node and other filaments cross from the right side of the one node to the left side of the other node.

11. A structure according to claim 10 wherein between adjacent nodes in each row some of the filaments remain on the right sides of the two nodes and some of the filaments remain on the left sides of the two nodes.

12. A structure according to claim 11 wherein a filament that remains to one side of two adjacent nodes beyond those nodes crosses to the opposite sides of the nodes located immediately beyond them in a row, and vice-versa, whereby the filaments alternate from a crossing disposition to a side diposition from one web to the next in any row.

13. A composite structure comprising: a plurality of filaments arranged in rows with the filaments of each row being built up on each other in a stacked disposition, the rows being oriented at different angles and intersecting each other at nodes where the filaments of the intersecting rows are interlaced, each node including a central area and the filaments of each row which passes through that node being located on both sides of the central area for the node so that those filaments where they are interlaced with the filaments of another row do not create an excessive build-up of filaments at the node; and a rigid matrix in which the filaments of the rows are embedded, the matrix holding the filaments together to form a rigidified grid-like structure having rigid webs which are joined together at the nodes, the webs having solid mid-portions and bifurcated ends, with the bifurcated ends being merged into the nodes.

14. A composite structure comprising: a plurality of filaments arranged in rows with the filaments of each row being built up on each other in a stacked disposition, the rows being oriented at different angles and intersecting each other at nodes where the filaments of the intersecting rows are interlaced, some of the filaments of each row crossing other filaments of the row between successive nodes of the row, each node including a central area and the filaments of each row which passes through that node being located on both sides of the central area for the node so that those filaments where they are interlaced with the filaments of another row do not create an excessive build-up of filaments at the node; and a rigid matrix in which the filaments of the rows are embedded, the matrix holding the filaments together to form a rigidified grid-like structure having rigid webs which are joined together at the nodes.

15. A structure according to claim 14 wherein the side walls of the webs are concave.

16. A composite structure comprising: a plurality of filaments arranged in rows with the filaments of each row being built up on each other in a stacked disposition, the rows being oriented at different angles and intersecting each other at nodes where the filaments of the intersecting rows are interlaced, each node including a central area and the filaments of each row which passes through that node being located on both sides of the central area for the node so that those filaments where they are interlaced with the filaments of another row do not create an excessive build-up of filaments at the node; and a rigid matrix in which the filaments of the rows are embedded, the matrix holding the filaments together to form a rigidified grid-like structure having rigid webs through which the filaments pass, with the webs being joined together at the nodes, as to each web, some of the filaments therein crossing from the left side of the web to the right side of the web between the nodes at the end of the web, some crossing from the right side to the left side so as to pass over the previously named filaments in the vicinity of the mid-portion of the web, some remaining on the left side of the web, and some remaining on the right side of the web.

17. A structure according to claim 16 wherein a filament which crosses from one side to the other in one web remains wholly on the sides of webs adjacent to it in the row and vice versa, whereby the filaments alternate from a crossing disposition to side disposition from one web to the next in any row.

* * * * *